United States Patent

Hongo et al.

[11] 3,909,485
[45] Sept. 30, 1975

[54] FLAME-RESISTANT GLASS-FIBER REINFORCED POLYTETRAMETHYLENE TEREPHTHALATE RESIN COMPOSITION

[75] Inventors: Masafumi Hongo; Ryoji Handa; Kazumasa Kamada, all of Ohtake, Japan

[73] Assignee: Mitsubishi Rayon Co., Ltd., Tokyo, Japan

[22] Filed: July 10, 1974

[21] Appl. No.: 487,252

[30] Foreign Application Priority Data
July 11, 1973 Japan.............................. 48-77410
Apr. 30, 1974 Japan.............................. 49-47574

[52] U.S. Cl......... 260/40 R; 260/45.75 B; 260/835; 260/860; 260/DIG. 24
[51] Int. Cl.². C08K 3/22; C08K 5/02; C08L 63/02; C08L 67/02
[58] Field of Search... 260/40 R, 860, 835, DIG. 24, 260/45.75 B

[56] References Cited
UNITED STATES PATENTS

| | | | |
|---|---|---|---|
| 3,524,901 | 8/1970 | Najvar | 260/861 X |
| 3,535,253 | 10/1970 | Hindersinn et al. | 260/DIG. 24 |
| 3,645,962 | 2/1972 | Schwarz | 260/860 X |
| 3,671,487 | 6/1972 | Abalins | 260/40 R |
| 3,751,396 | 8/1973 | Gall | 260/40 R |
| 3,814,725 | 6/1974 | Zimmerman et al. | 260/40 R |
| 3,843,615 | 10/1974 | Herwig et al. | 260/835 X |
| 3,855,277 | 12/1974 | Fox | 260/40 R |

*Primary Examiner*—Donald E. Czaja
*Assistant Examiner*—S. M. Person
*Attorney, Agent, or Firm*—Oblon, Fisher, Spivak, McClelland & Maier

[57] ABSTRACT

A flame-resistant glass-fiber reinforced resin composition comprising glass-fiber filled polytetramethylene terephthalate, a flame retardant, and antimony trioxide, characterized in that said flame retardant consists of a compound represented by the general formula (I),

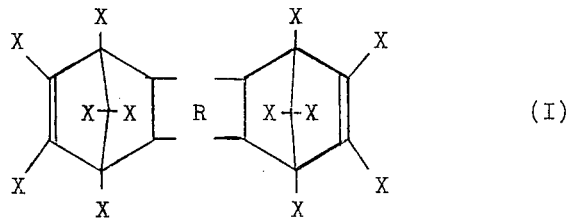

wherein X represents a chlorine or bromine atom and R represents a residue for connecting the left and right ring structures to form a tetrahydrofuran, cyclopentane, cyclooctane, endomethylenecylohexane, or endomethylenehydroindan ring and a halogenated bisphenol-based epoxy resin having a degree of halogenation of 10% by weight or more and represented by the general formula (II),

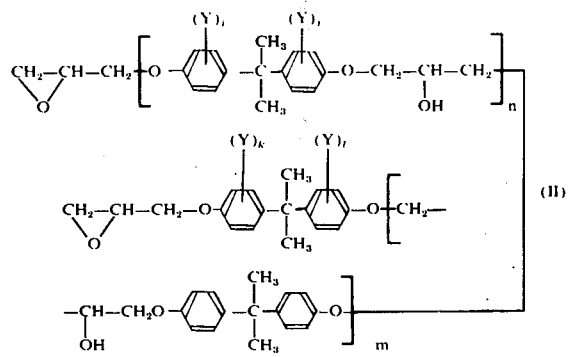

wherein Y represents a chlorine or bromine atom, each of i, j, k, and l represents a number of from 1 to 4, and (n + m) represents a mean degree of polymerization in the range of from 0 to 10; the proportions of the compounds of the formulas (I) and (II) being 3 to 30 parts by weight and 0.3 to 25 parts by weight, respectively, per 100 parts by weight of said polytetramethylene terephthalate and the weight ratio of said flame retardant to said antimony trioxide being 0.25 – 6.00 to 1. The present composition is excellent in mechanical properties, thermal properties, moldability and flame resistance.

8 Claims, No Drawings

FLAME-RESISTANT GLASS-FIBER REINFORCED POLYTETRAMETHYLENE TEREPHTHALATE RESIN COMPOSITION

This invention relates to a glass-fiber reinforced resin composition based on polytetramethylene terephthalate and excellent in mechanical properties, thermal properties, moldability, and flame retardancy.

As compared with glass-fiber reinforced nylon resins, the glass-fiber reinforced polytetramethylene terephthalate has no problem of hygroscopicity, as predicted from its polymer structure. It has also little problems in moldability, because the crystallization rate is higher than that of glass-fiber reinforced polyethylene terephthalate, and hence, crystallization is sufficiently accelerated even at a mold temperature of up to 100°C. in injection molding without addition of a nucleating agent. Thus, as compared with glass-fiber reinforced nylon or polyethylene terephthalate, the glass-fiber reinforced polytetramethylene terephthalate is well-balanced in all resin characteristics such as mechanical properties, thermal properties, moldability, and hygroscopicity, and, accordingly, has a promising future as a new engineering resin.

The polytetramethylene terephthalate resin, however, has also a problem to be solved in flammability as with other resins. Therefore, it is of great significance in view of the aforesaid excellent resin characteristics to impart a flame resistance to the resin. Since the molding temperature for the resin is as relatively high as and ranges as widely as from 230° to 300°C., the flame retardant to be used is required to be heat resistant and these have been desired flame retardants which hardly decompose at a temperture in the neighbourhood of 300°C. and neither color the final molded articles nor deteriorate the resin characteristics. Being high in heat deflection temperature and excellent in mechanical properties at elevated temperatures, the glass-reinforced polytetramethylene terephthalate resin is mainly used in the field of articles which are used at high temperatures, such as electrical parts. In making the resin flame resistant, the resulting composition is required to give heat resistant molded articles which, when used under a high-temperature atmosphere even for a long period of time, will become neither deteriorated in flame retardancy due to escape of the flame retardant caused by heat nor markedly discolored. While it is required in making the glass-fiber reinforced polytetramethylene terephthalate resin flame retarding to retain all of the characteristic properties inherent to the resin in order to utilize the resin to the best advantage, the real situation is such that there has never been obtained a composition which fulfils all such requirements, because those compositions which are satisfactory in so-called initial physical properties, that is, excellent in flame retardancy and low in deterioration in mechanical properties or thermal properties such as heat deflection temperature, are markedly inferior in thermal stability of the final molded articles, and, conversely, those which are excellent in thermal stability have unbalanced initial physical properties.

It has been well known that in imparting a flame retarding property to thermoplastic resins, generally halogen-substituted aromatic compounds such as, for example, tetrabromophthalic anhydride, hexabromobenzene, or a halogenated Bisphenol-A are used as a flame retardant together with antimony trioxide. It is easily predictable for those skilled in the art to apply such a flame retardant to glass-fiber reinforced polytetramethylene terephthalate. In fact, a flame resistant glass-fiber reinforced polytetramethylene terephthalate resin composition is obtained by incorporation of the said flame retardant and antimony trioxide in an appropriate ratio. However, upon close evaluation and examination of these systems, the present inventors have found that when the glass-fiber reinforced polytetramethylene terephthalate resin composition incorporating such halogen-substituted aromatic compounds as a flame retardant is exposed to a high-temperature atmosphere, the composition undergoes strong discoloration and the flame retardant escapes from the composition by the action of heat, resulting in a decrease in flame resistance with the lapse of time, and the resin composition becomes finally flammable.

The present inventors have done extensive research on flame retardants capable of imparting flame resistance to glass-fiber reinforced polytetramethylene terephthalate without deteriorating the excellent characteristics of the resin per se, such as mechanical properties, thermal properties, and moldability, while taking into consideration the thermal stability and appearance problems of molded articles, such as surface gloss, discoloration, and the like.

According to this invention, there is provided a flame resistant, glass-fiber reinforced resin composition comprising glass-fiber-filled polytetramethylene terephthalate, at least one compound represented by the general formula:

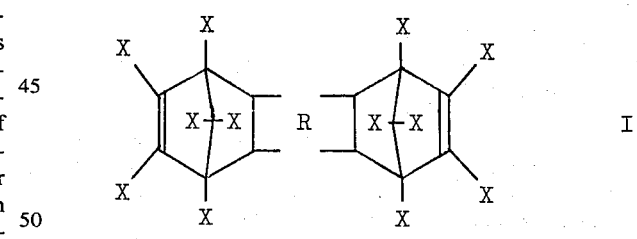

wherein X represents a chlorine or bromine atom and R represents a residue for connecting the left and right ring structures to form a tetrahydrofuran, cyclopentane, cyclooctane, endomethylenecyclohexane, or endomethylenehydroindan ring, at least one halogenated bisphenol-based epoxy resin having a degree of halogenation of 10 percent by weight or more and represented by the general formula:

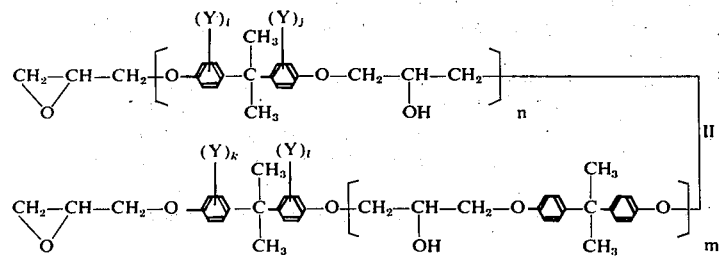

wherein Y represents a chlorine or bromine atom, each of i, j, k, and l represents a number of from 1 to 4, and (n + m) represents a mean degree of polymerization if the range of from 0 to 10, and antimony trioxide; the proportions of the compounds of the formulas I and II being 3 to 30 parts by weight and 0.3 to 25 parts by weight, respectively, per 100 parts by weight of said polytetramethylene terephthalate; and the weight ratio of the compounds I and II to antimony trioxide being 0.25 – 6.00 : 1.

A composition obtained by incorporating a flame retardant of the formula I and antimony trioxide in glass-fiber reinforced polytetramethylene terephthalate has an excellent flame resistance but offers, in some cases, depending on the thickness of the molded article, a chance to spread the fire by dripping. Further, the molding temperature for this composition greatly affects the mechanical properties of the molded article, such as tensile strength and flexural strength. A molding temperature (cylinder temperature) as high as 270°C. or even higher is needed to obtain a molded article having excellent mechanical properties. A high molding temperature, however, tends not only to enhance discoloration during molding operation, which decreases the commercial value of the final molded article, but also to deteriorate mechanical properties owing to the molecular weight reduction of the glass-fiber-reinforced polytetramethylene terephthalate, which occurs rapidly at a molding temperature exceeding 290°C. Thus, the molding temperature range of the composition is very narrow, restricting greatly the molding operation.

On the other hand, the molded article from the composition comprising glass-fiber reinforced polytetramethylene terephthalate, a flame retardant of the formula II, and antimony trioxide has mechanical properties which are less affected by the molding temperature, has an excellent appearance, and, when exposed to a high-temperature atmosphere, neither allows the flame retardant to escape by the action of heat nor is subject to a change in flame resistance with the lapse of time. In such a composition, however, when a high-degree flame resistance is required, a larger amount of the flame retardant becomes necessary, bringing about problems of both deterioration in heat deflection temperature and increased discoloration of the molded article under a high-temperature atmosphere.

According to this invention, the combined use of flame retardants of the formulas I and II and antimony trioxide results in not only an excellent flame resistance and thermal stability comparable or even superior to those in the case where a compound of the formula I is used alone, but also a marked improvement in moldability of the composition, whereby the dependency of mechanical properties on the molding temperature is eliminated, and the molded article is not colored even at high molding temperatures. Moreover, the coloration of the molded article under a high-temperature atmosphere also becomes as low as negligible even if a large amount of an epoxy resin of the formula II is used.

According to this invention, the co-use of the flame retardants of formulas I and II and antimony trioxide enables the composition of this invention to have such properties that the flame resistance and thermal stability are more excellent than when only the flame retardant of formula I and antimony trioxide are used, and that even when the composition is burnt, no drips are formed, and even if drips are formed and fall on other materials, the drips do not cause the materials to burn. In addition, the processability, dependency upon processing temperature and coloration at the time of processing are greatly improved. Even when the amount of the flame retardant of formula II is increased, the coloration of the composition under a high-temperature atmosphere is very low.

The compounds of the formula I to be used as a flame retardant in this invention are, for example, those of the following formulas:

(1) 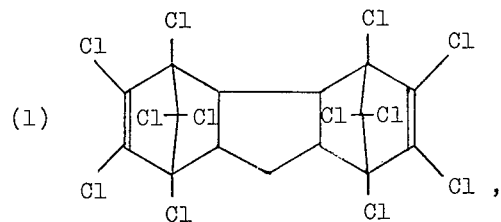

(2) 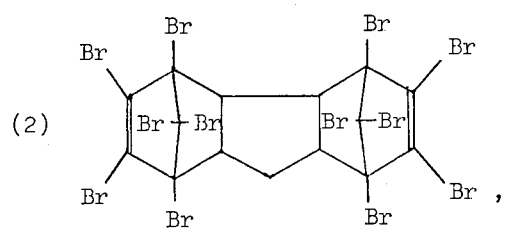

(3) 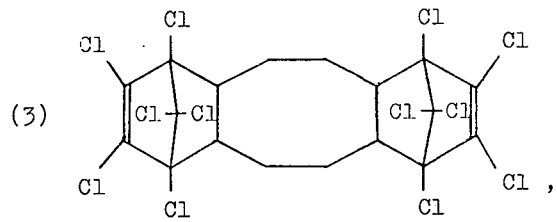

(4) 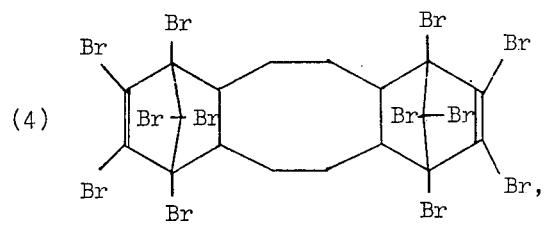

(5) 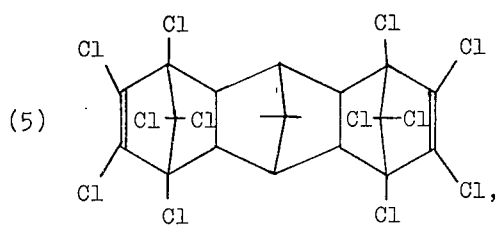

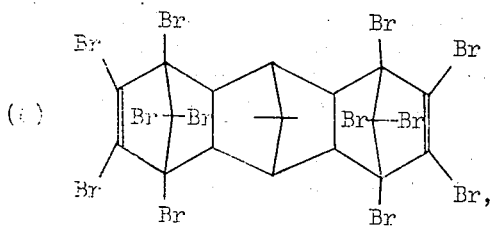

(6)

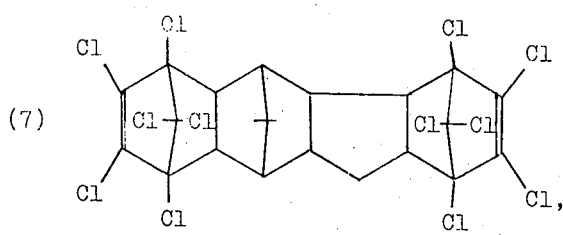

(7)

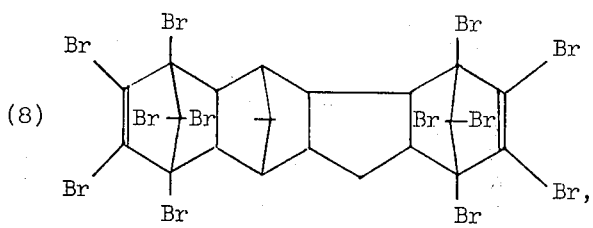

(8)

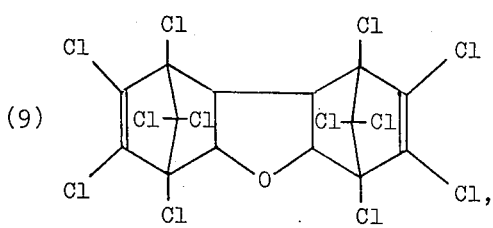

(9)                                         and

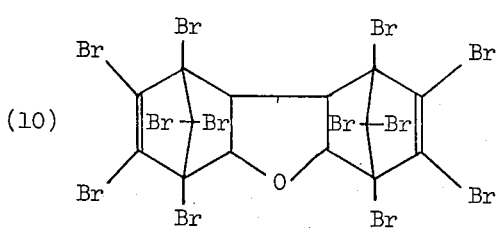

(10)

These compounds may be used alone or in admixture of two or more. These compounds may be prepared by Diels-Alder reaction of, for example, furan, cyclopentadiene, 1,5-cyclooctadiene, endomethylenecyclohexadiene, endomethyleneindene, or the like with a polyhalogenated cyclopentadiene. Mixtures of two polyhalogenated cyclopentadienes may be used. All of the products have a high melting point and an excellent thermal stability.

The halogenated bisphenol-based epoxy resins of the formula II to be used as the other flame retardant may be prepared by condensation of, for example, a tetrahalogenated Bisphenol-A and, if necessary, Bisphenol-A with epichlorohydrin or epibromohydrin. These epoxy resins are of the homo, block, or random type and contain 10 percent by weight or more of a halogen. The term "homo" refers to n being zero in formula II, and the terms "block" and "random" refer to modes of connection

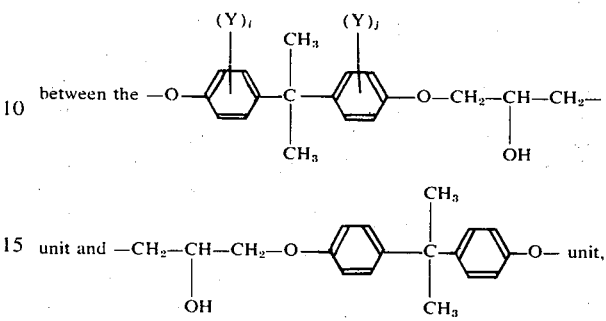

the former meaning each unit forming a block and the latter meaning the two units being bonded at random to each other. The halogenated bisphenol-based epoxy resins of formula II may be used alone or in admixture of two or more.

In the formula II, bisphenol units may be either the same or different. The desired degree of halogenation of the epoxy resin of the formula II can be obtained by adjusting the degree of halogenation and the amount of the starting halogenated Bisphenol-A to be used in the condensation step.

The mean degree of polymerization represented by (n + m) ranges from 0 to 10, particularly from 0 to 7. A high molecular weight epoxy resin, in which (n + m) is larger than 10, is difficult to uniformly disperse in the molded article, and deteriorates the resin characteristics. Even epoxy resins having a degree of polymerization (n + m) ranging from 0 to 10 are somewhat different in flame retarding effect depending on the degree of polymerization. When an epoxy resin having a degree of polymerization (n + m) ranging from 0 to 1.5 is used, the molded article forms drips on exposure to flame but the drips do not cause the firing of other articles on which the drips fall. For instance, according to the flammability test specified in Underwriters' Laboratories (U.S.A.) Bulletin 94 (hereinafter abbreviated to UL-94), when a molded article specimen has a short combustion time and does not drip flaming particles that ignite the absorbent cotton placed 12 inches below the specimen, it is determined as V-O or V-I, indicating highly self-extinguishing grade. The above requirements can be met when an epoxy resin of the formula II having a mean degree of polymerization (n + m) ranging from 0 to 1.5 is used in the present composition.

On the other hand, when an epoxy resin having a mean degree of polymerization (n + m) ranging from 1.5 to 10, is used, the molded article specimen shows a non-dripping property in the flammability test and, of course, does not ignite said absorbent cotton, meeting the requirements for a self-extinguishing grade.

Therefore, by the combined use of an epoxy resin having a mean degree of polymerization ranging from 0 to 10 along with the flame retardant of formula I and antimony trioxide, it is possible to impart a highly self-extinguishing property to the resin composition without deteriorating characteristic properties thereof.

The values of n and m may be varied in the range where (n + m) is 0 to 10 by varying the ratio between a halogenated Bisphenol-A and Bisphenol-A in preparing the halogenated epoxy resin by condensation. In view of practicability and a high flame resistance, it is desirable that $i = j = k = l = 2$ and $m = 0$, under which conditions the synthesis is easy and the degree of halogenation becomes highest.

The amounts of flame retardants of the formulas I and II and antimony trioxide added to the composition may be varied depending on the degree of flame resistance, though the amount of the compound of the formula I is 3 to 30, preferably 5 to 25, parts by weight per 100 parts by weight of polytetramethylene terephthalate, the amount of the compound of the formula II is 0.3 to 25, preferably 0.5 to 15, parts by weight per 100 parts by weight of polytetramethylene terephthalate, the total sum of both being preferably 5.5 to 40 parts by weight. If the total sum is less than 5.5 parts by weight, no satisfactory flame retarding effect is obtained, while if the total sum exceeds 40 parts by weight, the resin characteristics are deteriorated.

The weight ratio of the total sum of the amounts of flame retardants I and II to the amount of antimony trioxide ranges suitably from 0.25 : 1 to 6.00 : 1, preferably from 0.25 : 1 to 5.0 : 1, more preferably from 0.3 : 1 to 4.0 : 1. If the ratio is smaller than 0.25 : 1, the excess antimony trioxide deteriorates the mechanical properties of the molded article, while if the ratio exceeds 6.00 : 1, the synergistic effect of antimony trioxide is reduced.

The flame retardants of the formulas I and II and antimony trioxide may be incorporated in polytetramethylene terephthalate resin while the latter is still in the molten state during or after polymerization or may be added to chips of the resin in the step of blending with glass fiber, the latter procedure being preferred for operational convenience and other reasons.

Polytetramethylene terephthalate is synthesized from 1,4-butanediol and dimethyl terephthalate by the method described in, for example, the Journal of Polymer Science, Vol. 4, pp. 1851 – 1859 (1966). The resin can be replaced, if necessary, either by a cocondensation polymer obtained by addition of a small amount of a diol such as ethylene glycol, 1,3-propanediol, or the like, or a carboxylic acid such as isophthalic acid or the like, to the above-noted starting materials or by a polymer mixture of polytetramethylene terephthalate and 40% by weight or less of other polymers.

The intrinsic viscosity ($\eta$) of the polymer to be used ranges from 0.4 to 3.0 dl/g, as measured in a mixed solvent of tetrachloroethane-phenol (50 : 50) at 25°C. A polymer having an intrinsic viscosity of 0.6 to 1.5 dl/g is particularly preferred for the reasons of mechanical properties of the molded article and flow properties of the resin composition in the injection molding operation.

The type of glass fiber and the method of blending glass fiber with the resin have no particular restriction. Glass fibers in the form of rovings or short fibers for dispersion may be used, though the short fiber dispersing method is particularly preferable for the reason of productivity. Short fibers, 0.4 to 6 mm in length, are particularly preferred in view of ease of blending, abrasion of the molding machine, and cutting of fibers during molding operation. A sufficient length of fibers in the molded article is 0.2 to 2 mm. Commercially available glass fibers, which have been subjected to various treatments, may be used as such. The glass-fiber content of the resin composition ranges from 5 to 40 percent by weight. A glass-fiber content in excess of 40 percent by weight is deleterious to moldability of the resin composition by reason of its adverse effect on flow characteristics in molding operation, while a content below 5 percent by weight results in a reduced reinforcing effect.

Preparation of the present composition can be carried out, for example, by thoroughly mixing sufficiently dried chips of polytetramethylene terephthalate, the flame retardants of the formulas I and II, antimony trioxide, and glass fiber in a V-shaped blender and then subjecting the mixture to melt-blending, or, alternatively, by melt-blending polytetramethylene terephthalate, the flame retardants of the formulas I and II, and antimony trioxide and then adding glass fiber to the melt. If necessary, the present composition may contain stabilizers against light and heat and additives such as dyestuffs, pigments, etc.

The invention is explained below in detail with reference to Examples which are merely by way of illustration and not by way of limitation. The values of ($\eta$) given in the Examples are such as determined in a mixed solvent of tetrachloroethane-phenol (50 : 50) at 25°C.

EXAMPLES 1 TO 3

In a V-shaped blender were placed 3.0 kg of commercially available glass fiber in the form of chopped strand, 3 mm in length and about 10 $\mu$ in diameter, thoroughly dried polytetramethylene terephthalate (PTMT) having an intrinsic viscosity ($\eta$) of 0.95 dl/g, a compound A of the formula:

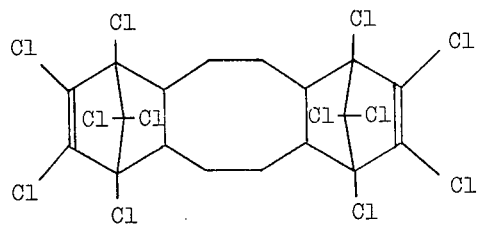

as the flame retardant of the formula I, a brominated bisphenol-based epoxy resin (bromine content, about 46%) as the flame retardant of the formula II, wherein $n = 1.8$, $m = 0$, $i = j = k = l = 2$, and antimony trioxide in the amounts given in Table 1, wherein figures in parentheses in the third and fourth columns mean parts by weight per 100 parts by weight of PTMT and those in the fifth column mean weight ratios of the flame retardants to antimony trioxide. The blender was operated for 5 minutes to mix the contents. The mixture from the blender was formed into pellets of a flame-resistant, glass-fiber-reinforced resin composition by means of a vent type 40-mm extruder at a cylinder temperature of 240° to 265°C.

The pellets were molded into a dumbbell test specimen, 3.2 mm in thickness, for tensile test, a test specimen, 3.2 mm in thickness, for impact test, and a test specimen, 6.4 mm in thickness, for testing the heat deflection temperature by use of a 5-oz 36-mm screw-type injection molding machine and a 3-cavity mold under the following molding conditions: cylinder temperature, 240°C., 260°C., or 280°C.; mold temperature, 100°C.; molding cycle, 60 seconds.

All of the test specimens were satisfactory in appearance, having excellent gloss and without showing shrink-mark, warpage, or coloration. Using these test specimens, the mechanical and thermal properties, flame resistance, and thermal stability were evaluated to obtain the results shown in Table 1.

In Comparative Example 1, no flame retardant of the formula II was added. In Comparative Example 2, no flame retardant of the formula I was added. In Comparative Examples 3 and 4, flame retardants of the formulas:

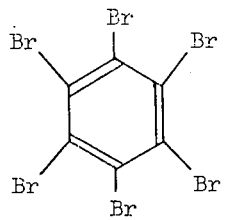

and

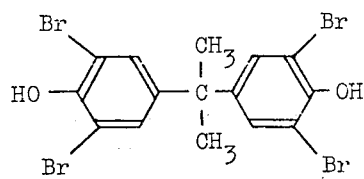

(Starting material for the flame retardant II)

were used, respectively, in place of the flame retardant of the formula I. In Comparative Example 5, a flame retardant of the formula:

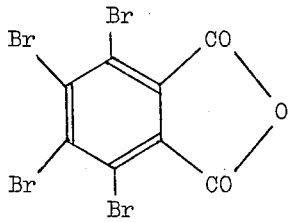

was used in place of the flame retardant of the formula II. In Comparative Example 6, no flame retardant was used. In Tables 1 to 6, the degree of coloration of the molded article was evaluated by taking the coloration of a glass-fiber reinforced polytetramethylene terephthalate containing no flame retardant as the standard (◯); other testing methods were as follows: tensile strength, ASTM D 638; flexural strength, ASTM D 790; Izod impact strength (V-notched) ASTM D 256; heat deflection temperature (264 psi load), ASTM D 648; LOI (least oxygen index), ASTM D 2863. The thermal stability shows values after the test specimens had been kept at 150°C. for 7 days. The dripping property was rated by taking no dripping as the standard (◎) in the flammability test.

Table 1

| | PTMT (kg) | Flame retardant A (kg) | Flame retardant II (kg) | $Sb_2O_3$ (kg) | Molding temperature (°C) | Coloration | Tensile strength (kg/cm²) | Flexural strength (kg/cm²) |
|---|---|---|---|---|---|---|---|---|
| Example 1 | 5.3 | 0.9 (17.0) | 0.27 (5.0) | 0.53 (2.2) | 240 | ◎ | 1230 | 1940 |
| | | | | | 260 | " | " | 1950 |
| | | | | | 280 | " | 1310 | 2020 |
| 2 | 5.6 | 0.56 (10.0) | 0.28 (5.0) | 0.56 (1.5) | 240 | ◎ | 1240 | 1900 |
| | | | | | 260 | " | 1260 | 1940 |
| | | | | | 280 | " | 1250 | " |
| 3 | 5.46 | 0.44 (8.0) | 0.55 (10.0) | 0.55 (1.8) | 240 | ◎ | 1250 | 1920 |
| | | | | | 260 | " | 1250 | 1960 |
| | | | | | 280 | " | 1290 | 1950 |
| Comp. Ex. 1 | 5.5 | 1.00 (18.2) | — | 0.5 (2.0) | 240 | ◯ | 1030 | 1580 |
| | | | | | 260 | ◯ | 1170 | 1800 |
| | | | | | 280 | △ | 1290 | 1950 |
| Comp. Ex. 2 | 5.38 | — | 1.08 (20.0) | 0.54 (2.0) | 240 | ◎ | 1150 | 1800 |
| | | | | | 260 | " | 1200 | 1890 |
| | | | | | 280 | " | 1170 | 1860 |
| 3 | 5.6 | 0.56 (10.0) | 0.28 (5.0) | 0.56 (1.5) | 240 | " | 1180 | 1750 |
| | | | | | 260 | " | 1200 | 1860 |
| | | | | | 280 | ◯ | 1170 | 1850 |
| 4 | " | " | " | " | 240 | | 1080 | 1700 |
| | | | | | 260 | " | 1100 | 1740 |
| | | | | | 280 | " | 1150 | 1790 |
| 5 | " | " | " | " | 240 | ◯ | 1020 | 1640 |
| | | | | | 260 | " | " | 1650 |
| | | | | | 280 | △ | 1080 | 1720 |
| 6 | 7.0 | — | — | — | 240 | ◎ | 1250 | 1980 |
| | | | | | 260 | " | 1280 | 2000 |
| | | | | | 280 | " | 1300 | " |

Table 1 — Continued

| Izod impact strength (kg.cm/cm) | Heat deflection temperature (°C) | LOI | Thermal stability LOI | Thermal stability Coloration | Non-dripping property |
|---|---|---|---|---|---|
| 7.0 | 204 | — | — | — | — |
| 6.9 | 205 | 32.5 | 32.0 | ○ | ◎ |
| 7.2 | '' | — | — | — | — |
| 7.6 | 205 | — | — | — | — |
| 7.7 | '' | 31.0 | 31.0 | ○ | ◎ |
| 7.5 | 206 | — | — | — | — |
| 6.8 | 203 | — | — | — | — |
| 7.0 | 204 | 29.5 | 29.5 | ○ | ◎ |
| 6.9 | '' | — | — | — | — |
| 6.4 | 205 | — | — | — | — |
| 6.5 | 206 | 30.5 | 30.0 | ○ | ◎ ~ △ |
| '' | '' | — | — | — | — |
| 6.0 | 202 | — | — | — | — |
| 6.3 | '' | 32.0 | 31.0 | × | × |
| 5.7 | 201 | — | — | — | — |
| 6.2 | 203 | — | — | — | — |
| 6.4 | 204 | 31.0 | 24.0 | ○ | ○ |
| '' | '' | — | — | — | — |
| 5.2 | 193 | — | — | — | — |
| 4.7 | 194 | 30.5 | 26.5 | × | △ |
| 4.6 | 196 | — | — | — | — |
| 5.7 | 200 | — | — | — | — |
| '' | 202 | 28.5 | 24.5 | ○ | ○ |
| 5.6 | 203 | — | — | — | — |
| 7.4 | 206 | — | — | — | — |
| 7.9 | 207 | 22.0 | 22.0 | ○ | ◎ ~ △ |
| 8.1 | '' | — | — | — | — |

EXAMPLES 4 TO 6

Molded test specimens were prepared from 5.6 kg of thoroughly dried polytetramethylene terephthalate having ($\eta$) of 0.95 dl/g, 3.0 kg of commercially available glass fiber in the form of chopped strand, 0.28 kg of a brominated bisphenol-based epoxy resin (bromine content, about 46%) of the formula II (n = 1.8, m = 0, i = j = k = l = 2) (5.0 parts by weight per 100 parts by weight of the resin), 0.56 kg of antimony trioxide (weight ratio of the flame retardants to antimony trioxide, 1.5), and 0.56 kg of a flame retardant of the formula I (10.0 parts by weight per 100 parts by weight of the resin) shown in Table 2. Mixing, extrusion, and injection molding (molding temperature, 260°C.) were carried out in the same manner as in Example 1. The test specimens had excellent appearance. Evaluation was conducted in the same manner as in Example 1. The results obtained were as shown in Table 2.

EXAMPLES 7 TO 9

Molded test specimens were prepared from glass fiber (3.5 kg), polytetramethylene terephthalate having ($\eta$) of 0.93 dl/g, compound A used as the flame retardant of the formula I, a brominated bisphenol-based epoxy resin (bromine content, 20%) of the formula II (n = 0, m = 3, k = l = 2), and antimony trioxide. The amounts of each component were as shown in Table 3. Mixing, extrusion, and injection molding (molding temperature, 260°C.) were carried out in the same manner as in Example 1. Evaluation was conducted in the same manner as in Example 1 to obtain the results shown in Table 3, in which figures in parentheses in the third to fifth columns have the same meanings as in Table 1.

Table 2

| Example No. | Flame retardant (I) | Coloration | Tensile strength (kg/cm²) |
|---|---|---|---|
| 4 | [structure: brominated compound with Br substituents and O bridge] | ◎ | 1300 |
| 5 | [structure: chlorinated compound with Cl substituents] | '' | 1260 |
| 6 | [structure: chlorinated compound with Cl substituents] | '' | 1250 |

Table 2 – Continued

| Example No. | Flexural strength (kg/cm$^2$) | Izod impact strength (V-notched), (kg.cm/cm) | Heat deflection temp. (°C) | LOI | Thermal stability LOI | Thermal stability Coloration |
|---|---|---|---|---|---|---|
| 4 | 2000 | 7.2 | 203 | 32.0 | 31.5 | ○ |
| 5 | 1920 | 7.0 | 204 | 30.5 | 30.5 | ○ |
| 6 | 1910 | 6.9 | 205 | 31.0 | 30.5 | ○ |

Table 3

| Example No. | PTMT (kg) | Flame retardant I (kg) | Flame retardant II (kg) | Sb$_2$O$_3$ (kg) | Coloration | Tensile strength (kg/cm$^2$) | Flexural strength (kg/cm$^2$) | Izod impact strength (V-notched) (kg.cm/cm) | Heat deflection temperature (°C) | LOI | Thermal stability LOI | Thermal stability Coloration | Non-dripping property |
|---|---|---|---|---|---|---|---|---|---|---|---|---|---|
| 7 | 4.72 | 0.75 (16.0) | 0.09 (2.0) | 0.94 (0.9) | ◎ | 1180 | 1970 | 6.5 | 205 | 30.5 | 30.0 | ○ | ◎ |
| 8 | 4.92 | 0.79 (16.0) | 0.25 (5.0) | 0.54 (1.9) | ◎ | 1330 | 2050 | 6.0 | 204 | 31.0 | 31.0 | ○ | ◎ |
| 9 | 4.91 | 0.78 (16.0) | 0.49 (10.0) | 0.32 (4.0) | ◎ | 1310 | 2020 | 6.2 | 203 | 32.5 | 32.0 | ○ | ◎ |

EXAMPLES 10 TO 12

In a V-shaped blender were placed 3.0 kg of commercially available glass fiber in the form of chopped strand, 3 mm in length and about 10 $\mu$ in diameter, thoroughly dried polytetramethylene terephthalate (PTMT) having ($\eta$) of 0.97 dl/g, a compound A of the formula:

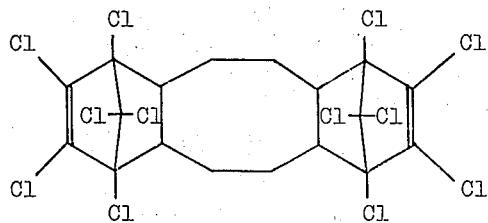

used as the flame retardant of the formula I, a brominated bisphenol-based epoxy resin (bromine content, about 48%) used as the flame retardant of the formula II (n = 0.14, m = 0, i = j = k = l = 2), and antimony trioxide in the ratios as shown in Table 4, wherein figures in parentheses in the third and fourth columns mean parts by weight per 100 parts by weight of PTMT and those in the fifth column mean weight ratio of flame retardants to antimony trioxide. The blender was operated for 5 minutes to mix the contents. The mixture from the blender was formed into pellets of a flame-resistant, glass-fiber reinforced resin composition by means of a vent type 40-mm extruder at a cylinder temperature of 240° to 265°C.

The pellets were molded into a No. 1 dumbbell test specimen, 3.2 mm in thickness, for tensile test, a test specimen, 3.2 mm in thickness, for impact test, a test specimen, 6.4 mm in thickness, for testing heat deflection temperature under load, and test specimens for flammability test, by use of a 5oz. 36-mm screw-type injection molding machine under the following molding conditions: cylinder temperature, 260°C.; mold temperature, 100°C.; molding cycle, 60 seconds. All of the test specimens were satisfactory in appearance, having excellent gloss and without showing shrink-mark, warpage, or coloration. Using these test specimens, the mechanical and thermal properties, flame resistance (flammability test according to UL-94), etc., were evaluated to obtain the results shown in Table 4.

In Comparative Example 7, no flame retardant of the formula II was used. In Comparative Example 8, no flame retardant of the formula I was used. In Comparative Example 9, no flame retardants were used.

Evaluation was carried out in the same manner as in Example 1, except that flame resistance was evaluated in accordance with UL-94 on 5 test specimens, 127 mm × 12.7 mm × 0.8 mm (thickness).

Table 4

| Example No. | PTMT (kg) | Flame retardant A (kg) | Flame retardant II (kg) | $Sb_2O_3$ (kg) | Color-ation | Tensile strength (kg/cm²) | Flexural strength (kg/cm²) | Izod impact strength (kg.cm/cm) |
|---|---|---|---|---|---|---|---|---|
| 10 | 5.3 | 0.9 (17.0) | 0.27 (5.0) | 0.53 (2.2) | ◎ | 1210 | 1970 | 6.8 |
| 11 | 5.38 | 0.54 (10.0) | 0.54 (10.0) | 0.54 (2.0) | ◎ | 1300 | 2000 | 6.5 |
| 12 | 5.46 | 0.44 (8.0) | 0.66 (12.0) | 0.44 (2.5) | ◎ | 1280 | 1990 | 6.2 |
| Comp. Ex. No. 7 | 5.47 | 0.98 (18.0) | — | 0.55 (1.53) | ○ | 1180 | 1800 | 6.4 |
| 8 | 5.47 | — | 0.98 (18.0) | 0.55 (1.53) | ◎ | 1190 | 1910 | 6.0 |
| 9 | 7.00 | — | — | — | ◎ | 1280 | 2000 | 8.0 |

| Heat deflection temperature (°C) | Flammability (UL-94) (per 10 ignition tests) | | | |
|---|---|---|---|---|
| | Number of drips | Cotton ignition (number of times) | Mean burning time (second) | Class |
| 202 | 5 | 0 | 0.4 | V — O |
| 200 | 5 | 0 | 0.35 | V — O |
| 199 | 7 | 0 | 0.5 | V — O |
| 206 | 4 | 4 | 5.25 | V — II |
| 196 | 10 | (large mass) 2 | 1.20 | V — II |
| 207 | Caused | Caused | Burnt out | Burnt |

EXAMPLES 13 TO 15

Molded test specimens were obtained by using 5.6 kg of thoroughly dried polytetramethylene terephthalate having ($\eta$) of 0.97 dl/g, 3.0 kg of commercially available glass fiber in the form of chopped strand, 0.28 kg of a brominated bisphenol-based epoxy resin (bromine content, about 48%) of the formula II (n = 0.14, m = 0, i = j = k = l = 2) (5.0 parts by weight per 100 parts by weight of the resin), 0.56 kg of antimony trioxide (weight ratio of the flame retardant to antimony trioxide, 1.5), and 0.56 kg of a flame retardant of the formula I, shown in Table 5 (10.0 parts by weight per 100 parts by weight of the resin). Mixing, extruding, and injection molding (at a cylinder temperature of 260°C.) were carried out in the same manner as in Example 10. The specimens had an excellent appearance. Evaluation was conducted in the same manner as in Example 10 to obtain the results as shown in Table 5.

Table 5

| Example No. | Flame retardant (I) | Color-ation | Tensile strength (kg/cm²) |
|---|---|---|---|
| 13 | 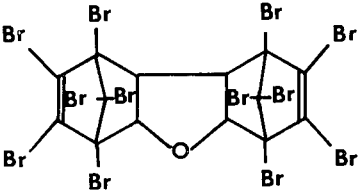 | ◎ | 1270 |
| 14 | 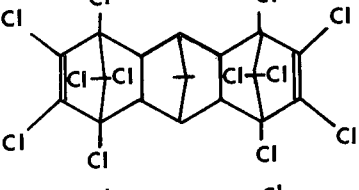 | ◎ | 1260 |
| 15 | 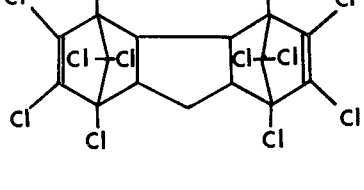 | ◎ | 1200 |

Table 5—Continued

| Example No. | Flexural strength (kg/cm²) | Izod impact strength (kg.cm/cm) | Heat deflection temp. (°C) | Flammability (UL-94) (per 10 ignition tests) | | | Class |
|---|---|---|---|---|---|---|---|
| | | | | Number of drips | Cotton ignition (number of times) | Mean burning time (sec) | |
| 13 | 1990 | 6.9 | 201 | 5 | 0 | 0.55 | V — O |
| 14 | 1950 | 6.8 | 202 | 5 | 0 | 1.05 | V — O |
| 15 | 1900 | 7.0 | 202 | 6 | 0 | 0.90 | V — O |

EXAMPLES 16 TO 18

Molded test specimens were obtained by using 3.0 kg of glass fiber, thoroughly dried polytetramethylene terephthalate having ($\eta$) of 0.97 dl/g, a compound A as the flame retardant of the formula I, a brominated bisphenol-based epoxy resin (bromine content, about 50%) of the formula II (n = 1.0, m = 0, i = j = k = l = 2), and antimony trioxide in the proportions given in Table 6 (figures in parenthese in the third to fifth columns have the same meanings as in Table 1). Mixing, extrusion, injection molding (cylinder temperature, 260°C.), and evaluation of the molded test specimens were conducted in the same manner as in Example 10. The results obtained were as shown in Table 6.

The pellets were molded into molded test specimens by means of a 5-oz 36-mm screw-type injection molding machine under the following conditions: cylinder temperature, 260°C.; mold temperature, 100°C.; molding cycle, 60 seconds. The test specimens had the following physical properties:

| | |
|---|---|
| Tensile strength | 1,200 kg/cm² |
| Flexural strength | 1,860 kg/cm² |
| Izod impact strength | 6.2 kg.cm/cm |
| Heat deflection temperature | 205°C. |
| Coloration | ◎ |
| LOI | 33.5 |
| Thermal stability { LOI | 33.5 |
| { Coloration | O |
| Non-dripping property | ◎ |

Table 6

| Example No. | PTMT (kg) | Flame retardant A (kg) | Flame retardant II (kg) | Sb₂O₃ (kg) | Coloration | Tensile strength (kg/cm²) | Flexural strength (kg/cm²) | Izod impact strength (kg.cm/cm) |
|---|---|---|---|---|---|---|---|---|
| 16 | 5.42 | 0.33 (6.0) | 0.43 (8.0) | 0.82 (0.93) | ◎ | 1150 | 1870 | 7.0 |
| 17 | 5.60 | 0.78 (14.0) | 0.34 (6.0) | 0.28 (4.0) | ◎ | 1310 | 2020 | 6.8 |
| 18 | 6.10 | 0.30 (5.0) | 0.30 (5.0) | 0.30 (2.0) | ◎ | 1290 | 2000 | 7.2 |

| Heat deflection temperature (°C) | Flammability (UL-94) (per 10 ignition tests) | | | Class |
|---|---|---|---|---|
| | Number of drips | Cotton ignition (number of times) | Mean burning time (second) | |
| 202 | 7 | 0 | 1.55 | V — O |
| 202 | 6 | 0 | 1.00 | V — O |
| 203 | 6 | 0 | 7.20 | V — I |

EXAMPLE 19

In a V-shaped blender were placed 3.0 kg of glass fiber, 5.3 kg of PTMT, 0.85 kg of the flame retardant A (16 parts by weight per 100 parts by weight of PTMT), 0.32 kg of a flame retardant II (bromine content, about 52%), where n = 5, m = 0, i = j = k = l = 2 (6 parts by weight per 100 parts by weight of PTMT), 0.53 kg of antimony trioxide (weight ratio of the flame retardants to antimony trioxide, 2.2). The blender was operated for 5 minutes to mix the contents. The mixture was formed into pellets of a flame-resistant, glass-fiber reinforced resin composition by means of a vent type 40-mm extruder at a cylinder temperature of 240° to 265°C.

EXAMPLE 20

In the same manner as in Example 19, injection molded test specimens were obtained by using 3.0 kg of glass fiber, 5.3 kg of PTMT, 0.96 kg of the flame retardant A (18 parts by weight per 100 parts by weight of PTMT), 0.21 kg of a flame retardant of the formula II (bromine content, about 55%) wherein n = 1, m = 1, i = j = k = l = 4 (4 parts by weight per 100 parts by weight of PTMT), and 0.53 kg of antimony trioxide (weight ratio of the flame retardants to antimony trioxide, 2.2).

EXAMPLE 21

Injection molded specimens were obtained in the same manner as in Example 20, except that a flame retardant II (chlorine content, about 22%) where n = 2, m = 2, i = j = k = l = 2 was used.

The test specimens obtained in Examples 20 and 21 had the following physical properties:

|  | Example 20 | Example 21 |
|---|---|---|
| Tensile strength (kg/cm$^2$) | 1,220 | 1,200 |
| Flexural strength (kg/cm$^2$) | 1,890 | 1,900 |
| Izod impact strength (kg.cm/cm) | 6.5 | 5.9 |
| Heat deflection temperature (°C.) | 206 | 203 |
| Coloration | ◎ | ◎ |
| LOI | 35.0 | 30.5 |
| Thermal stability {LOI | 34.5 | 30.5 |
| {Coloration | ○ | ○ |
| Non-dripping property | ◎ | ◎ |

What is claimed is:

1. A flame-resistant, glass-fiber-reinforced resin composition comprising glass-fiber-filled polytetramethylene terephthalate, a flame retardant, and antimony trioxide characterized in that said flame retardant consists of at least one compound represented by the general formula (I):

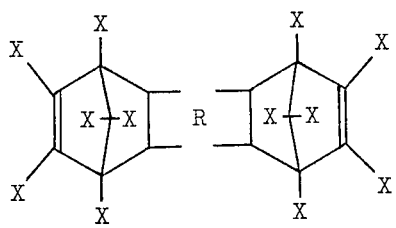

wherein X represents a chlorine or bromine atom and R represents a residue for connecting the left and right ring structures to form a tetrahydrofuran, cyclopentane, cyclooctane, endomethylenecyclohexane, or endomethylenehydroindan ring and at least one halogenated bisphenol-based epoxy resin having a degree of halogenation of 10 percent by weight or more and represented by the general formula (II):

wherein Y represents a chlorine or bromine atom, each of i, j, k, and l represents a number of from 1 to 4, and (n + m) represets a mean degree of polymerization ranging from 0 to 10; the proportion of the compound of the formula (I) ranges 3 to 30 parts by weight per 100 parts by weight of polytetramethylene terephthalate; and the proportion of said halogenated epoxy resin of the formula (II) is 0.3 to 25 parts by weight per 100 parts by weight of polytetramethylene terephthalate; the weight ratio of the flame retardants of the formulas (I) and (II) to antimony trioxide being 0.25 – 6.00 : 1.

2. A flame-resistant, glass-fiber-reinforced resin composition according to claim 1, wherein the flame retardant consists of a compound represented by the general formula (I) and a halogenated bisphenol-based epoxy resin having a degree of halogenation of 10 percent by weight or more and represented by the general formula (II).

3. A composition according to claim 1, wherein the glass-fiber content of the composition is 5 to 40 percent by weight.

4. A composition according to claim 1, wherein in the general formula (II), m = 0 and i = j = k = l = 2.

5. A composition according to claim 3, wherein the polytetramethylene terephthalate has an intrinsic viscosity ($\eta$) of 0.6 to 1.5 dl/g as measured in tetrachloroethane-phenol (50 : 50) mixture at 25°C.

6. A composition according to claim 1, wherein the compound of the formula (I) is a compound represented by the formula:

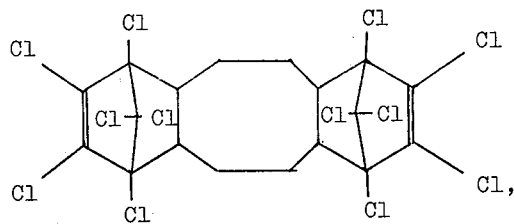

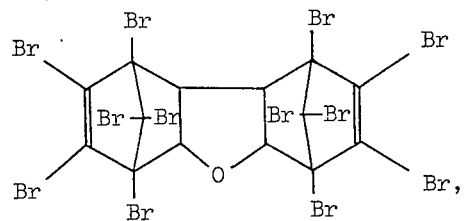

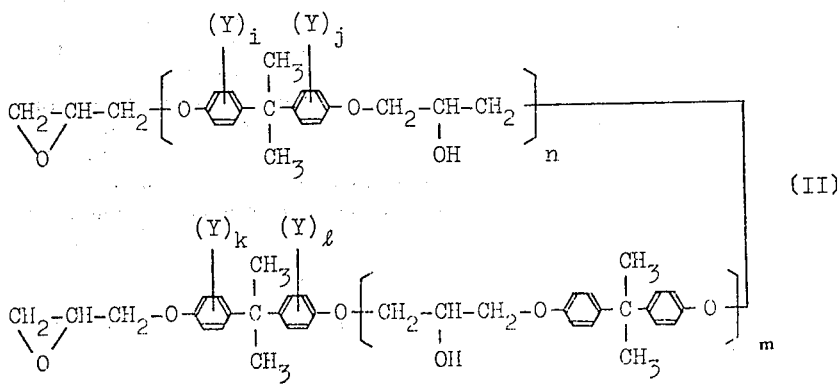

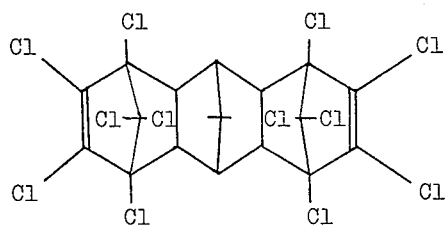 or 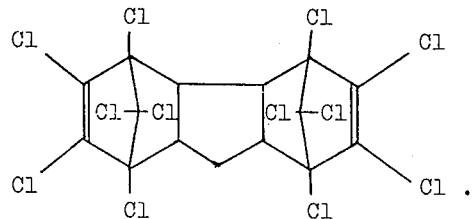
7. A composition according to claim 4, wherein n is a number of 1.5 to 10, and the weight ratio of the flame retardants to antimony trioxide is from 0.25 – 5.0 to 1.
8. A composition according to claim 4, wherein n is 0 or a number of less than 1.5, and the weight ratio of the flame retardants to antimony trioxide is 0.25 – 5.0 to 1.
* * * * *